(12) United States Patent
Toyohara et al.

(10) Patent No.: US 6,785,480 B2
(45) Date of Patent: Aug. 31, 2004

(54) IMAGE FORMING APPARATUS HAVING A PLURALITY OF IMAGE FORMING SPEEDS

(75) Inventors: Yuichiro Toyohara, Fujisawa (JP); Ken-ichiro Kitajima, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/939,598

(22) Filed: Aug. 28, 2001

(65) Prior Publication Data

US 2002/0025179 A1 Feb. 28, 2002

(30) Foreign Application Priority Data

Aug. 28, 2000 (JP) ........................................ 2000-257338

(51) Int. Cl.$^7$ ............................................ G03G 15/00
(52) U.S. Cl. ........................ 399/49; 399/394; 399/396
(58) Field of Search ............................ 399/38, 39, 46, 399/49, 67, 68, 70, 72, 82, 83, 389, 396, 394

(56) References Cited

U.S. PATENT DOCUMENTS

| | | | | |
|---|---|---|---|---|
| 5,566,372 A | * | 10/1996 | Ikeda et al. | ................... 399/46 |
| 5,689,760 A | * | 11/1997 | Suzuki et al. | ................. 399/45 |
| 5,809,366 A | * | 9/1998 | Yamakawa et al. | ........... 399/39 |
| 6,188,419 B1 | * | 2/2001 | Katamoto et al. | ........ 399/38 X |

OTHER PUBLICATIONS

U.S. patent application No. 09/935,830, filed Aug. 24, 2001.

* cited by examiner

*Primary Examiner*—Hoan Tran
(74) *Attorney, Agent, or Firm*—Fitzpatrick, Cella, Harper & Scinto

(57) ABSTRACT

An image forming apparatus includes a plurality of image forming devices for forming respective monochromatic images in accordance with input image signals. The apparatus is operable in a first mode for forming a multi-color image by the plurality of image forming devices at a first image formation speed and in a second mode for forming a multi-color image by the plurality of image forming devices at a second image formation speed. The apparatus also includes an execution device for executing, for respective image formation speeds, calibrating operations for correcting image density levels of output images formed by the image forming devices in response to image density levels of the input image signals.

18 Claims, 10 Drawing Sheets

IMAGE FORMING APPARATUS HAVING A PLURALITY OF IMAGE FORMING SPEEDS

FIELD OF THE INVENTION AND RELATED ART

The present invention relates to an image forming apparatus such as a copying machine, a printer, or a facsimile.

In recent years, full-colorization of graphic information has been progressing at a remarkable pace, and with this progress, demand for an image forming apparatus capable of outputting a large number of beautiful hard copies, faster and less expensively, have been increasing.

In order to satisfy the above described demand, an electrophotographic image forming apparatus has been variously devised.

For example, in order to satisfy the demand for speed, that is, increase in image formation speed, some of the recent electrophotographic image forming apparatuses are provided with four image bearing members so that charging, exposing, and developing processes can be virtually simultaneously carried out for all primary colors, to achieve an image formation speed of four times that of a conventional image forming apparatus which comprises only a single image bearing member. This method of employing four image bearing members is called the four drum method.

From the standpoint of transfer medium, an image forming apparatus has been devised so that fixing speed can be varied to achieve high image quality regardless of the recording medium on which an image is formed. Generally, in order to achieve high image quality while forming an image on a cardboard, an OHP sheet, or the like, fixing speed is varied. More specifically, fixing speed is reduced with the use of a conveying belt dedicated for fixation, while keeping constant, or unchanged, the image formation speeds in the image formation processes prior to fixation process.

However, providing an image forming apparatus with such a structural arrangement tends to increase the size of the main assembly of an image forming apparatus. Thus, a structural arrangement which increases the speeds for all the image formation processes has been also proposed in addition to the above described structural arrangement. This second proposal makes it possible to eliminate the conveying belt dedicated for image fixation, making it therefore possible to reduce the size of the image forming apparatus main assembly. The size reduction leads to cost reduction. In other words, the second proposal makes it possible to provide a small and inexpensive image forming apparatus.

On the other hand, changing the image formation speed of an image forming apparatus requires changes in virtually entire aspects of the image forming apparatus, for example, the characteristics of the photoconductive member, characteristics of developing means, or characteristics of the transferring means. Consequently, it changes the characteristics of the image forming apparatus in terms of output.

For example, in the case of the photoconductive member characteristics, as the image formation speed is varied, the time it takes for a given point of the peripheral surface of the photoconductive drum to move from the exposing station to the developing station varies. Therefore, even if two image forming operations different in image formation speed are rendered equal in the amount of the exposure of a given point of the peripheral surface of a photoconductive member in the exposing station, the two image forming operations do not always become equal in the potential level of the corresponding points of the peripheral surface of the photoconductive member, and neither do the two image forming operations different in image formation speed always become the same in the characteristics of the developing means. These differences between the two image forming operations regarding the changes in the characteristics of the photoconductive member, developing means, transferring means, and the like, manifest as differences between the two image forming operations in terms of total image output.

Thus, in the past, an image forming apparatus has been structured so that it can be controlled to cancel the changes in the above described characteristics so that an image of good quality can be outputted. It is thought that the characteristics of an image forming apparatus in terms of image output subtly change due to the changes in the environmental conditions, such as the temperature and humidity of the ambience in which the image forming apparatus is operated.

SUMMARY OF THE INVENTION

The present invention relates to an image forming apparatus which has a plurality of image formation speeds, and the primary object of the present invention is to provide an image forming apparatus which has a plurality of image formation speeds, and is capable of always outputting an image of optimal quality at all of the plurality of image formation speeds of the image forming apparatus.

These and other objects, features, and advantages of the present invention will become more apparent upon consideration of the following description of the preferred embodiments of the present invention, taken in conjunction with the accompanying drawings.

DESCRIPTION OF THE PREFERRED EMBODIMENTS

Figure 1:
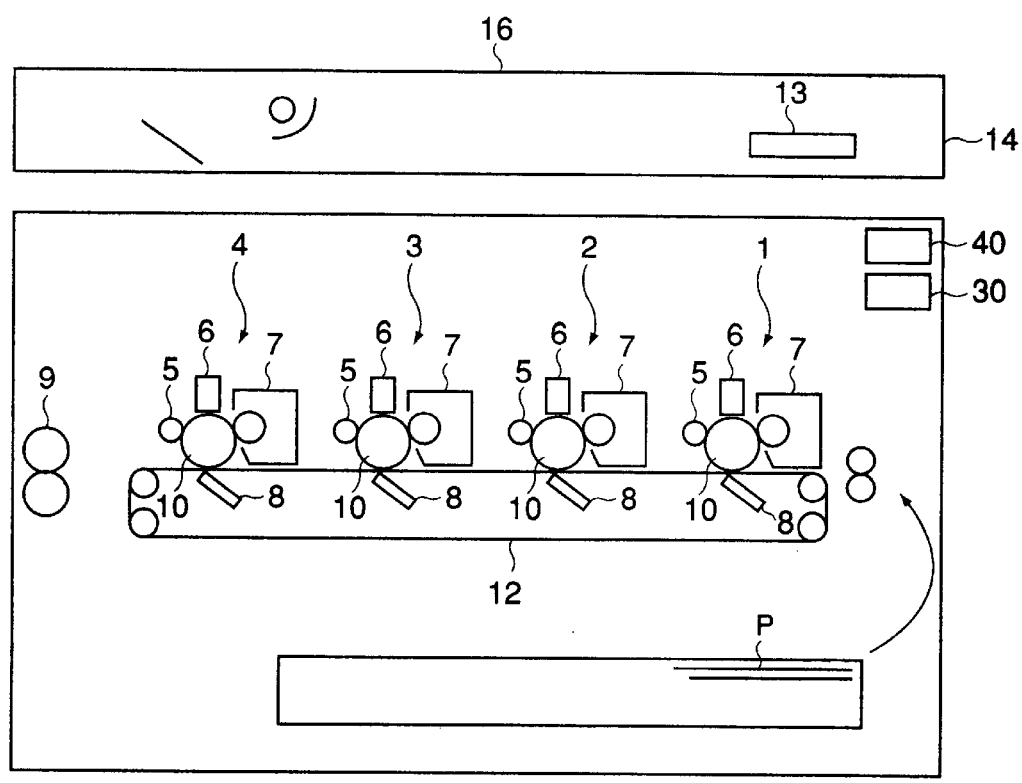
FIG. 1 is a vertical sectional view of an embodiment of an image forming apparatus in accordance with the present invention, for showing the general structure thereof.

Hereinafter, the embodiments of an image forming apparatus in accordance with the present invention will be described in detail with reference to the appended drawings.

Embodiment 1

Below, referring to FIGS. 1–8, the first embodiment of the present invention will be described. First, referring to FIG. 1, the image forming apparatus in this embodiment will be described. This image forming apparatus is a full-color image forming apparatus which employs an electrophotographic method, in particular, a full-color image forming apparatus which employs both an electrophotographic method and a four drum method.

Although this embodiment of the present invention will be described with reference to a copying machine capable of forming a full-color image, the present invention is also applicable to a printer, that is, an image forming apparatus which forms an image based on the image signals inputted from a computer connected to a network. Further, the present invention is applicable to an image forming apparatus enabled to function as a copying machine as well as a printer, and also a facsimile machine, that is, an image forming apparatus enabled to send or receive an image through a network.

To concisely describe an image formation process, first, the peripheral surface of a photoconductive drum 10 as an image bearing member is uniformly charged by a primary charging device 5 as a charging means. Then, the uniformly charged peripheral surface of the photoconductive drum 10 is exposed by an LED array 6 as an exposing means, in response to the image formation signals inputted from the CCD 13 within a reader portion 14 for reading an original. As a result, an electrostatic latent image is formed on the peripheral surface of the photoconductive drum 10. The electrostatic latent image on the peripheral surface of the photoconductive drum 10 is developed into a toner image, that is, a visible image, by applying development bias, that is, a combination of AC voltage and DC voltage, to the development sleeve of a developing device 7 as a developing means. Then, the toner image is transferred onto a recording paper P as a recording medium. More specifically, transfer bias is applied to a transfer blade 8 as a transferring means. As a result, the toner image on the photoconductive drum 10 is transferred onto a recording paper which is held on a transfer belt 12 as a conveying means (which also is capable of functioning as a recording medium) and is being conveyed. Incidentally, the toner reproduction per picture element in this embodiment is binary. However, the present invention is also applicable to an image forming apparatus structured so that the toner reproduction per picture element is controlled in three or more levels, for example, an image forming apparatus which employs a semiconductor laser as an exposing means, and in which the toner reproduction per picture element can be controlled in three or more levels by controlling the pulse width of the laser.

When forming a monochromatic image on the recording paper P, the toner image having been transferred onto the recording paper P is fixed to the recording paper P by a fixing apparatus 9 as a fixing means.

When forming a full-color image on the recording paper P, the above described image formation process inclusive of the charging, exposing, developing, and transferring processes, are carried out in the first, second, third, and fourth image forming stations, which are the same in structure, in synchronism with the arrival of the recording paper P at the first to fourth image forming stations in this order. Thereafter, the thus formed full-color toner image is fixed to the recording paper P by the fixing apparatus in the same manner as is the monochromatic toner image. Then, the recording paper P is discharged out of the image forming apparatus.

In this embodiment, the full-color image formation speed is increased by employing four image forming stations as described above. Incidentally, the first, second, third, and fourth image forming stations form yellow, magenta, cyan, and black images, correspondingly.

This image forming apparatus is enabled to operate in three image formation modes according to recording medium type. The three image formation modes will be referred to as high speed mode (ordinary recording paper), standard mode (cardboard), and slow speed mode (OHP sheet (transparent resin sheet)), based on the speed at which an image can be formed on them. Thus, in this embodiment, the fixing speed (peripheral velocity of fixing roller pair) of the fixing apparatus is varied according to the recording medium type, and the peripheral velocity of the photoconductive drum, and the velocity at which the recording medium is conveyed by the transfer belt (peripheral velocity of transfer belt), and the like, are also varied to be matched with the varied fixing speed of the fixing apparatus. In turn, the peripheral velocity of the development sleeve is varied in response to the change in the peripheral velocity of the photoconductive drum.

In this embodiment, the fixing speed, peripheral velocity of the photoconductive drum, and recording medium conveying speed of the transfer belt are approximately the same, and these speeds are referred to together as image formation speed.

It should be noted here that the fixing speed, peripheral velocity of the photoconductive drum, and the recording medium conveying speed of the transfer belt, do not need to be exactly the same as long as an image of good quality can be formed. In other words, they may be slightly different as long as an image of good quality can be formed.

The image formation speeds correspondent to the three image formation modes are 150 mm/sec (high speed mode), 100 mm/sec (standard mode), and 50 mm/sec (slow speed mode). Corresponding image outputting speeds (number of copes outputted per minutes) are 30 ppm (prints per minutes), 20 ppm, and 10 ppm.

At this time, the standard image formation mode will be described.

Figure 2:
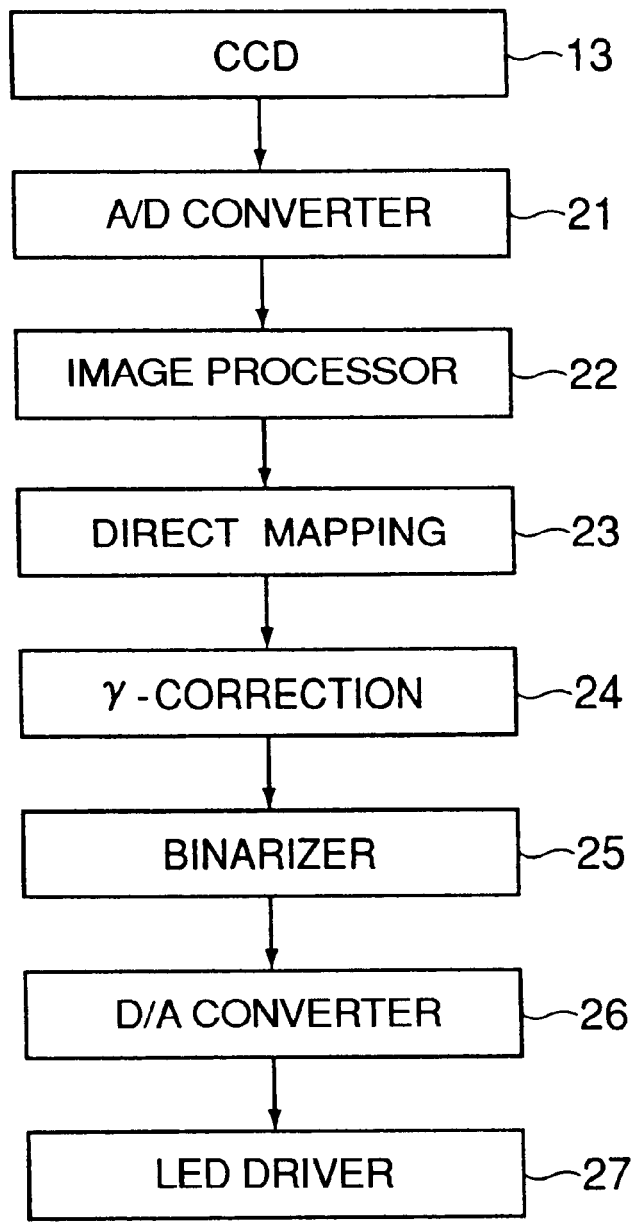
FIG. 2 is a flow chart for showing the flow of the image forming signals in the image forming apparatus shown in FIG. 1.

First, referring to FIG. 2 which is a conceptual drawing, the flow of image formation signals during an image formation operation will be described.

Analog R, G, and B signals are inputted into an A/D conversion portion of the image forming apparatus from the CCD 13 of a reader portion 14, or an external computer. In the A/D conversion portion, the analog R, B, and G signals are converted into digital R, G, and B signals, and are sent to the image processing portions 22, in which they are converted into C, M, Y, and K signals by the color conversion portion of the image processing portion 22. Next, the amount by which toner is adhered is set in the direct mapping portion, which will be described later. Thereafter, a gamma conversion process is carried out in the gamma control portion 24 to optimize the gamma characteristics of the printer. Then, these C, M, Y, and K signals in the eight bit form are converted into one bit signals by the binarization portion 25. Then, the digital signals are converted into analog signals by the D/A conversion portion 26, and sent to the LED driver 27 to drive the LED array for exposure.

Figure 3:
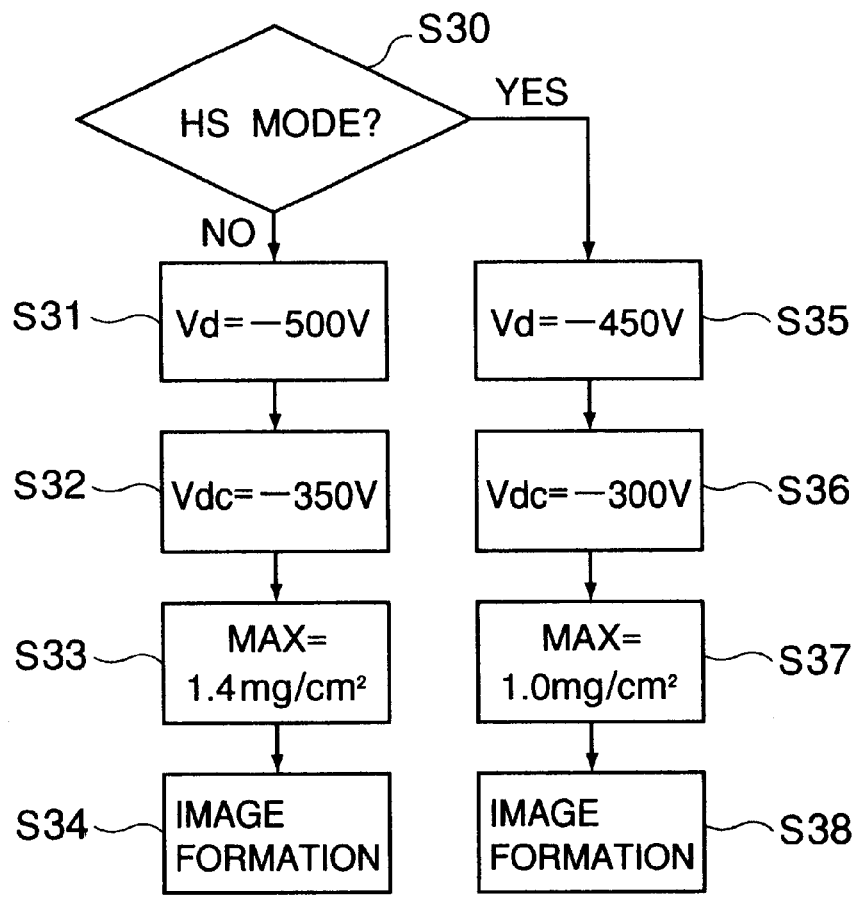
FIG. 3 is a flow chart for controlling the image forming apparatus in the first embodiment based on the image formation modes.

Next, referring to FIG. 3, the control in each image formation mode will be described. FIG. 3 is a flow chart for the operation of the image forming apparatus in this embodiment, in an environment in which temperature and humidity are 24° C. and 60%, respectively.

The image signal which produces the highest density in response to each eight bit color signal is represented by ffh (hexadecimal notation). Then, when the image forming apparatus is in the standard mode, the amount by which toner is adhered per ffh signal for each color during an image forming operation is 0.50 mg/cm 2, and the density of each color is 1.6.

Further, control is carried out by the direct mapping portion so that the amount by which toner is adhered per secondary or tertiary color, that is, color created by the mixture of two or three primary colors, does not exceed 1.4 mm/cm$^2$. This is done for the following reason. That is, the maximum amount of toner which is satisfactorily fixable while outputting 20 copies at an image formation speed of 100 mm/sec is 1.4 mg/cm$^2$, and 1.4 mg/cm$^2$ of toner is a sufficient amount of toner for satisfactorily reproducing the colors in the original image, in the standard mode.

Next, the processing condition for realizing this toner adhesion amount will be described.

First, it is determined whether or not the image forming apparatus is in the high speed mode (S30). When the image forming apparatus is not in the high speed mode, more specifically, when it is in the standard mode, the primary charge bias is set so that the potential level of the primary charge (which hereinafter will be referred to as Vd) of the photoconductive drum 10 becomes −500 V (S31). In this embodiment, the primary bias is set to −500 V. The exposing means is set to turn on and off the six diodes of the LED array 6 so that the potential level of the electrical charge (which hereinafter will be referred to as Vff) of a given point of the peripheral surface of the photoconductive drum becomes −150 V as the given point is exposed to light the intensity of which is equivalent to an image signal ffh (hexadecimal notation). Further, the value of the DC component of the development bias is set to −350 V (S32).

In other words, the development contrast (Vff−Vdc) is set to 200 V, and Vblack (Vdc−Vd) is set to 150 V. However, these values are the values to which the primary charge bias, development bias, and the like, are set in an environment in which temperature and relative humidity are 24° C. and 60%, respectively. In other words, the primary charge bias, development bias, and the like, are set to optimal values, based on the temperature and humidity data detected by an ambience sensor 30 as an ambient condition detecting means, so that the amount of toner to be adhered for each color becomes 0.50 mg/cm$^2$.

As described above, an actual image forming process is carried out (S34) while controlling the processing conditions so that the amount of toner to be adhered does not exceed 1.4 mg/cm$^2$ (S33).

In comparison, in the high speed mode, control is executed so that the amount of toner adhered to the peripheral surface of the photoconductive drum 10 per color in response per image formation signal ffh (hexadecimal notation) becomes 0.40 mg/cm$^2$.

In this case, the processing conditions are set as follows: Vd=−450 V; Vdc=−300 V; and Vff=−150 V (S35, S36). In other words, the development contrast is rendered smaller compared to that in the standard mode, and Vback is kept the same at 150 V. The maximum density for each color is 1.4. The actual image forming process is carried out (S38) while processing the image signals by the direct mapping portion 23 so that the amount of toner to be adhered for realizing the secondary or tertiary color does not exceed 1.0 mg/cm$^2$ (S37).

With this control, the reproducible color range becomes slightly smaller compared to that in the standard mode, but copies can be outputted at 30 ppm at an image formation speed of 150 mm/sec, without reduction in image fixation performance.

Figure 4:
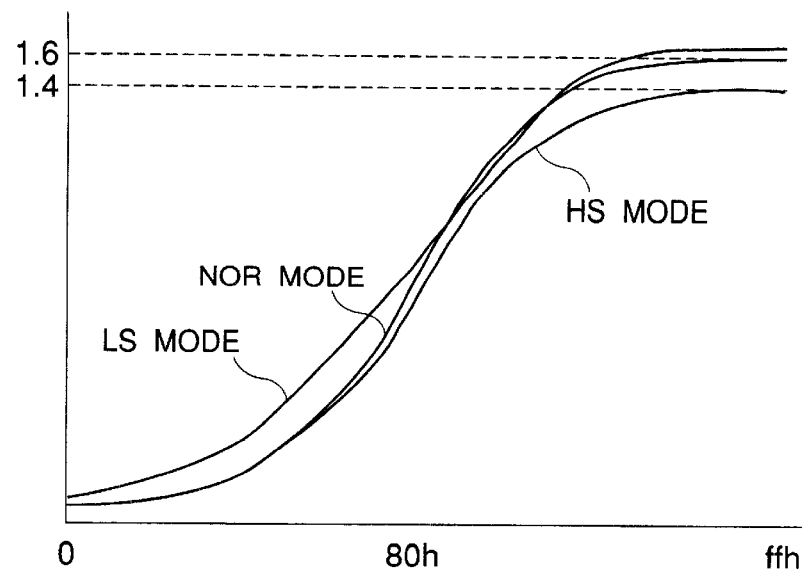
FIG. 4 is a graph for showing the characteristics of the image forming apparatus in the first embodiment, in terms of the image output, regarding all the image formation speeds.

Next, the characteristics of an image forming apparatus having the above described three image forming speeds will be described in terms of image output. FIG. 4 shows the characteristics of the image forming apparatus in terms of image output, regarding each image formation speed, when the gamma conversion process is not carried out. In FIG. 4, the axis of abscissa represents the density level of an inputted image signal, and the axis of ordinates represents the density level of the corresponding image output.

Figure 5:
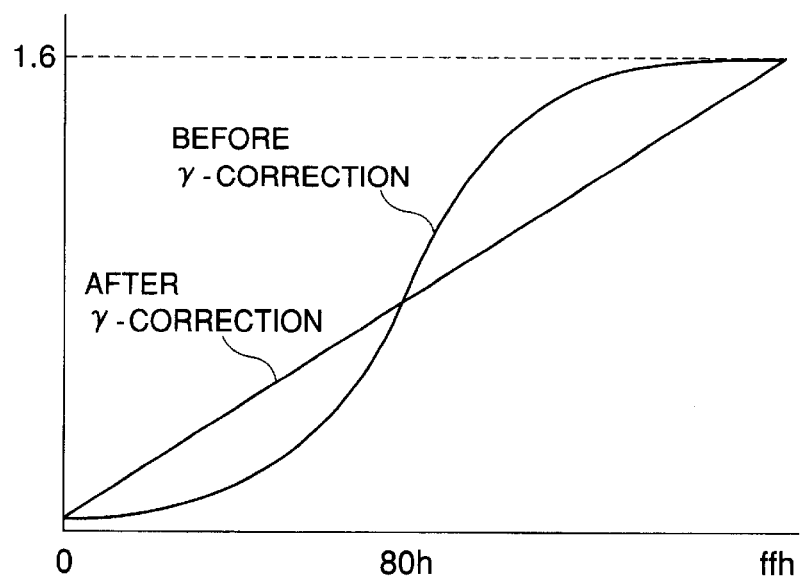
FIG. 5 is a graph for showing the characteristics of the image forming apparatus in the first embodiment, in terms of the relationship between the image output and image formation speed, with and without a gamma process.

The gamma conversion process for converting the image input characteristics in order to ensure that an image forming apparatus having image input characteristics such as those shown in FIG. 4 properly reproduces the colors and tone of an original is carried out by the gamma conversion portion of the apparatus. More specifically, an image forming apparatus is calibrated to rectify the image input characteristics so that the relationship between the density level of an inputted image signal and the density level of the image output resulting from the inputted image signal becomes linear (as shown in FIG. 5, which shows the relationship resulting from the gamma process). As for an example of the calibration, there is U.S. Pat. No. 5,566,372.

The gamma conversion process is carried out with the use of a lookup table. The characteristics of an image outputted while carrying out the gamma conversion process, and the characteristics of an image outputted without carrying out the gamma conversion process, are shown in FIG. 5. In FIG. 5, the axis of abscissa represents the density level of an inputted image signal, and the axis of ordinates represents the density level of an image output correspondent to the density level of the inputted image signal. As is evident from the line representing without gamma processing in FIG. 5, the relationship between the density level of image output and the density level represented by image signals is sometimes rendered improper by the deterioration of the components involved in image formation, ambience, and the like. This creates a problem regarding tone reproduction.

Thus, the gamma conversion process is carried out to convert the image output characteristics of the image forming apparatus into desired image output characteristics, so that the colors (and tone) of an original or intended image can be desirably reproduced.

Referring to FIG. 4, in terms of input and output, the characteristics of the image forming apparatus in this embodiment vary depending on image formation speed. Therefore, the lookup table for the gamma conversion process is prepared for each of three image formation speeds.

Therefore, colors are desirably reproduced at all three image formation speeds. Thus, a user can always obtain an image of optimal quality by selecting an image formation mode most suitable for the needs of the user.

In order to maintain the above described characteristics for the image forming apparatus, the image forming apparatus is calibrated in response to the ambient changes, for example, the changes in temperature or humidity, and the changes in the characteristics of the components resulting from apparatus usage. Therefore, virtually no problem occurs under normal conditions.

However, there is a possibility that the changes in the characteristics of the image forming apparatus in terms of the relationship between the input and output, which result from the changes in ambience and the changes in the characteristics of the components resulting from apparatus usage, will exceed the predicted range. If such a situation occurs, the apparatus outputs nothing but images which are different in characteristics from a desired image.

Figure 6:
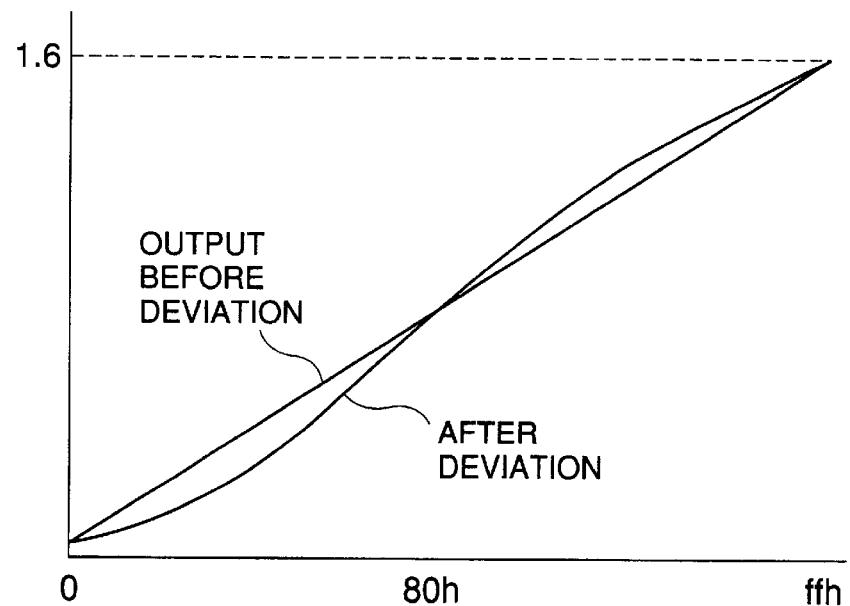
FIG. 6 is a graphs for comparing, in terms of output, the characteristics of the image forming apparatus in the first embodiment, which has changed, to that which has not changed.

The extent of the deviation of the image with incorrect characteristics from the desired image varies depending on image formation speed (image formation mode); the amount of the deviation is not uniform. Thus, in this embodiment, the image forming apparatus is calibrated for each image formation mode. FIG. 6 shows the relationship between the density level of an inputted image signal and the density level of the image output resulting from the inputted image signal, after the above described deviation has occurred. In FIG. 6, the axis of abscissas represents the density level of an inputted image signal, and the axis of ordinates represents the density of the output image resulting from the inputted image signal.

When the characteristics of the image forming apparatus in terms of input and output change beyond the predicted range as described above, the relationship in density level between image signals inputted into the image forming apparatus (density data of inputted image signals—image signals of original read in through CCD, image signals inputted from computer connected to image forming apparatus through network) and the image output (toner image formed on photoconductive drum or recording medium) resulting from the inputted image signals is modified; in other words, the calibration of the image forming apparatus is modified in terms of the relationship between its input and output.

The calibration in this embodiment means optimization of the relationship in density level between the input, or image signal, and the output, or the image resulting from the input. In other words, it is to measure the above described relationship with the use of a method which will be described later, and regulates the image signal conversion formula (which image density level, that is, which density level in density range of 0–ffh represented by the axis of abscissas in FIG. 5, is selected for each inputted image signal) so that the relationship between the inputted image signal and the resultant image output becomes as desired (becomes optimal).

Thus, a process for selecting an image density level for each inputted image signal so that the relationship between the inputted image signal and the resultant image output becomes optimal as described above is carried out, and the LED array 6 is turned on or off for exposure, in proportion to the thus selected density level for each inputted image signal (in multivalued control, pulse width of laser is controlled) to output an image of a desired density.

As for the means for modifying the characteristics of an image forming apparatus in terms of the relationship between the input and output, a photosensor as a density detecting means disposed within an image forming apparatus is used. It is possible to calibrate the image forming apparatus by detecting the density of the developer image formed on the photoconductive member or recording medium. Here, however, a calibration method which uses the reader portion 14 will be described.

Figure 7:
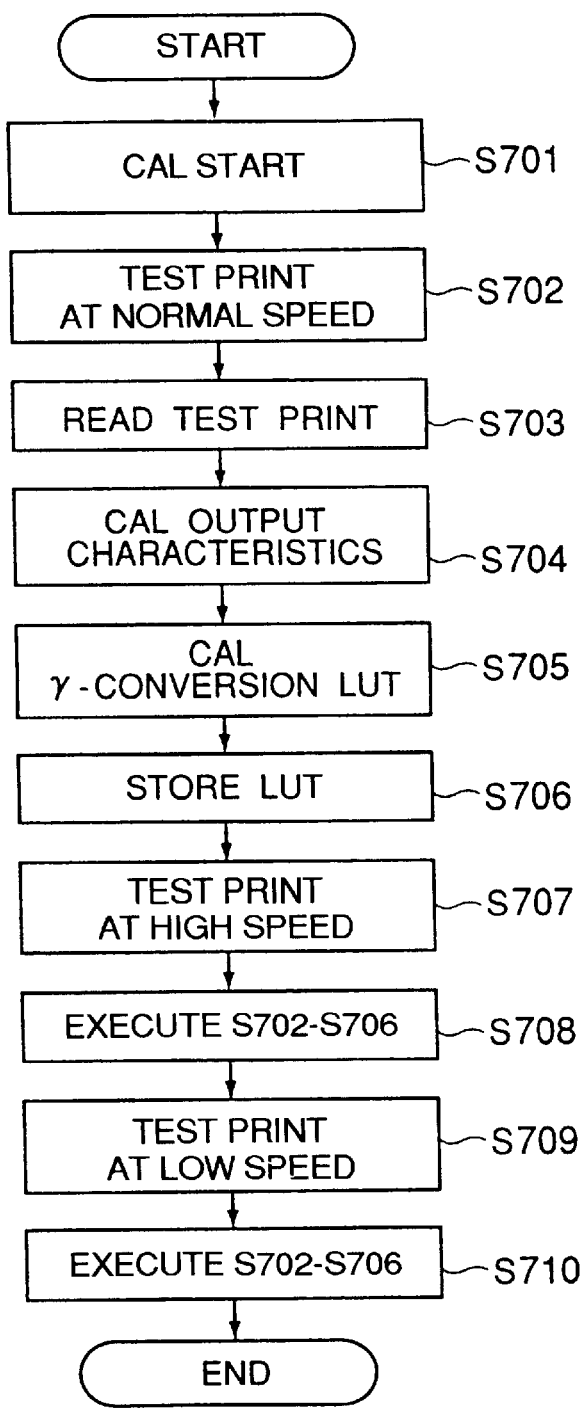
FIG. 7 is a flow chart for the calibration in the first embodiment.
Figure 8:
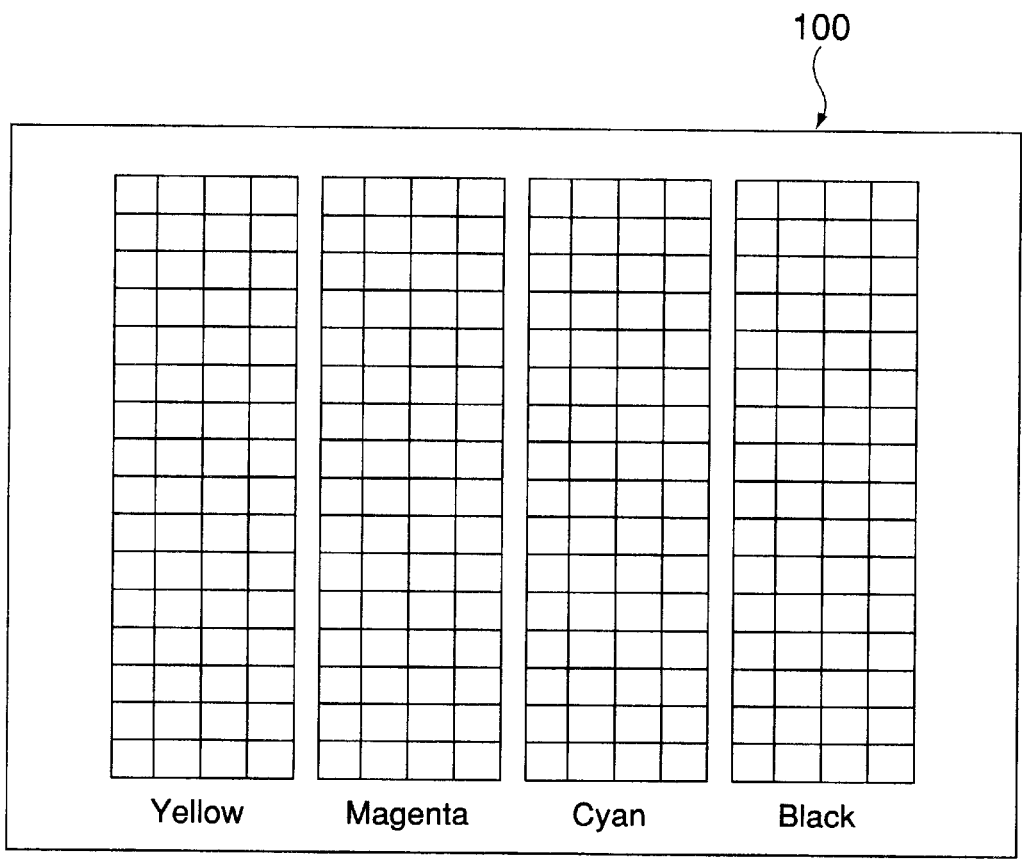
FIG. 8 shows the test print for the calibration in the first embodiment.

FIG. 7 is a flow chart for the calibration.

An operator is to press the calibration key of the liquid crystal display of the top portion of the image forming apparatus to initiate the calibration (S701). Then, a test print 100, that is, a recording paper on which a developer image for density detection such as the one shown in FIG. 8 has been formed, is outputted in the standard mode from the image forming apparatus (S702). This test print 100 is a recording paper on which 64 levels of toner gradation (64 toner density levels), which have been realized in response to the inputted image signals, have been recorded.

The test print 100 is placed on the original placement glass platen 16 (FIG. 1) of the reader portion 14 by the user (service person), and the reader portion 14 is instructed to read the test print 100, by the user through the above described liquid crystal display.

Then, the relationship between the detected density level in the test print 100 and the known density level (64 gradation levels) is calculated for each color by the control portion (CPU) of the image forming apparatus, to obtain the characteristics of the image forming apparatus in terms of the relationship between the input and output (S704). Then, gamma characteristics conversion lookup table (LUT) for calibrating the image forming apparatus in terms of the relationship between the input and output to produce an image of desired quality is created (S705).

The thus created lookup table is stored in the memory 40 (FIG. 1), (data in memory are refreshed for next calibration), (Figure S706). After the calibration, the normal image formation process is carried out in coordination with the data stored in the memory 40. Therefore, it is possible to always obtain images of good quality.

As soon as the calibration for the standard speed (standard mode) ends, a test print is outputted in the high speed mode (S707). Then, the calibration for the high speed is carried out in the same manner as was the calibration for the standard mode (S708). As the calibration for the high speed mode ends, a test print is outputted at the slow speed mode, or the last mode (S709). Then, the calibration for the slow speed is carried out in the same manner as were the preceding two calibrations (S710), ending the calibration sequence.

As described above, in this embodiment, the calibrations for the standard, high, and slow speed modes are carried out in sequence. In other words, as a single calibration button of the aforementioned liquid crystal display is pressed to calibrate the image forming apparatus for one of the three image formation modes, the image forming apparatus is automatically calibrated for all three different image formation modes, improving usability.

Obviously, the image forming apparatus may be structured so that it can be calibrated by an operator (user, service person), individually for each image formation speed, as necessary. With the provision of such a structural arrangement, the time necessary for calibration can be reduced by the amount which would have been spent for the calibration for unnecessary image formation speeds, reducing therefore the downtime of the image forming apparatus, the time spent on the image forming apparatus by an operator, and the like.

As described above, according to this embodiment, even if the characteristics of an image forming apparatus in terms of the relationship between the input and output becomes abnormal due to the unpredicted ambient changes, the image forming apparatus can be accurately calibrated for all the image forming speeds (image formation modes). Therefore, it is possible to always provide full-color images which are optimal in tone gradation, that is, full-color images, the tone of which are not different from a desired full-color image.

Embodiment 2

Figure 9:
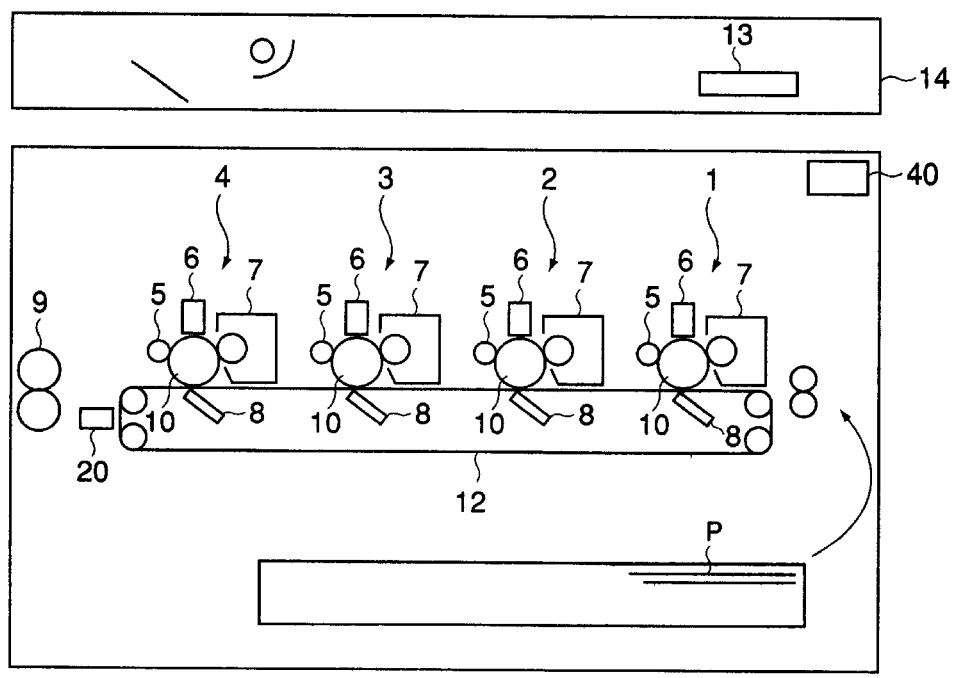
FIG. 9 is a vertical sectional view of another embodiment of an image forming apparatus in accordance with the present invention, for showing the general structure thereof.

Next, referring to FIGS. 9–11, the second embodiment of the present invention will be described.

The image forming apparatus in this embodiment also has three image formation speeds as did the image forming apparatus in the first embodiment, and the three image formation speeds correspond with three different image formation modes one for one. Referring to FIG. 9, the image forming apparatus is provided with a toner density sensor 20 as a density detecting means, which is disposed at the downstream end of the transfer belt 12 in terms of the direction in which the top side of the transfer belt 12 is moved. The sensor 20 detects the density of the toner image which has been transferred directly onto the transfer belt 12 from each photoconductive drum, and the characteristics of the image forming apparatus in terms of the relationship between the input and output are determined based on the results of the detection by the sensor 20. Then, the image forming apparatus is calibrated based on the thus obtained characteristics of the image forming apparatus.

In this embodiment, the calibration of the image forming apparatus is initiated as an operator instructs the apparatus to carry out the calibration. However, an image forming apparatus may be structured so that the image forming apparatus is automatically calibrated with predetermined timing.

Figure 10:
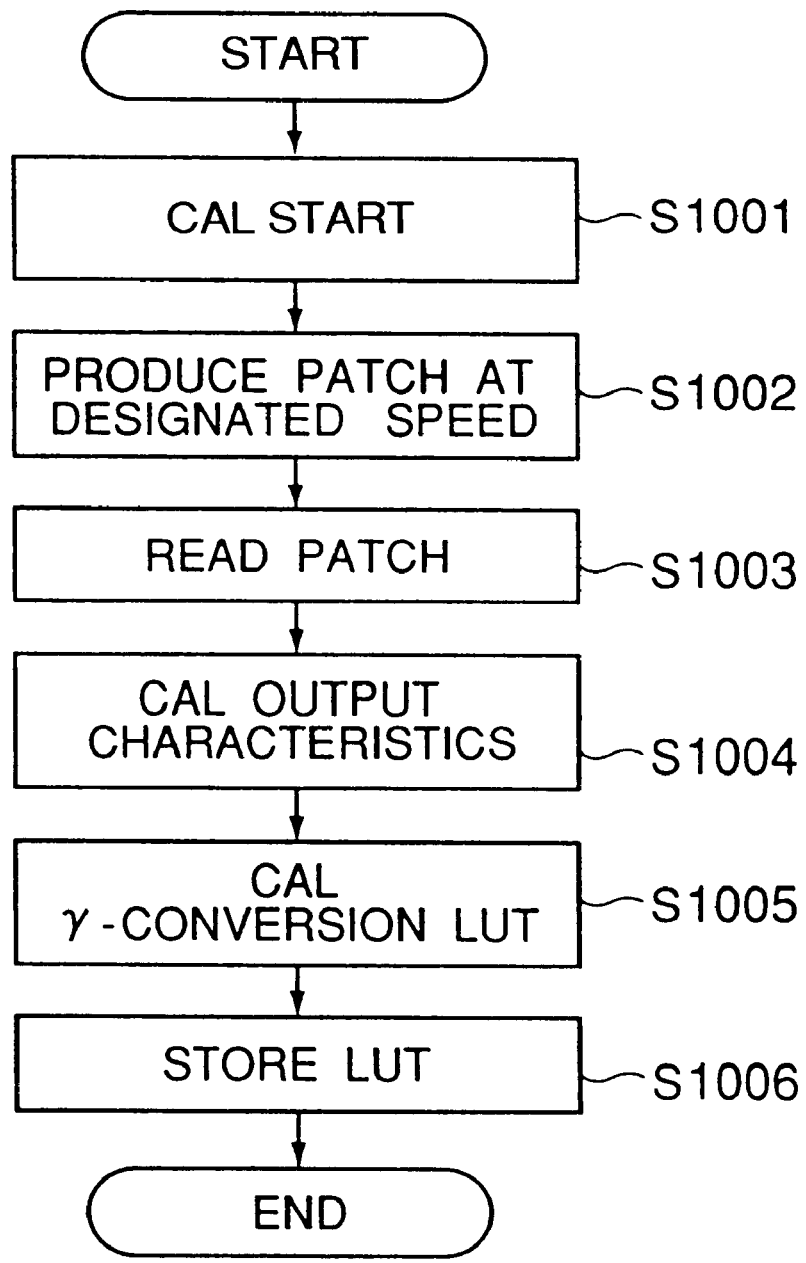
FIG. 10 is a flow chart for the calibration in the second embodiment of the present invention.
Figure 11:
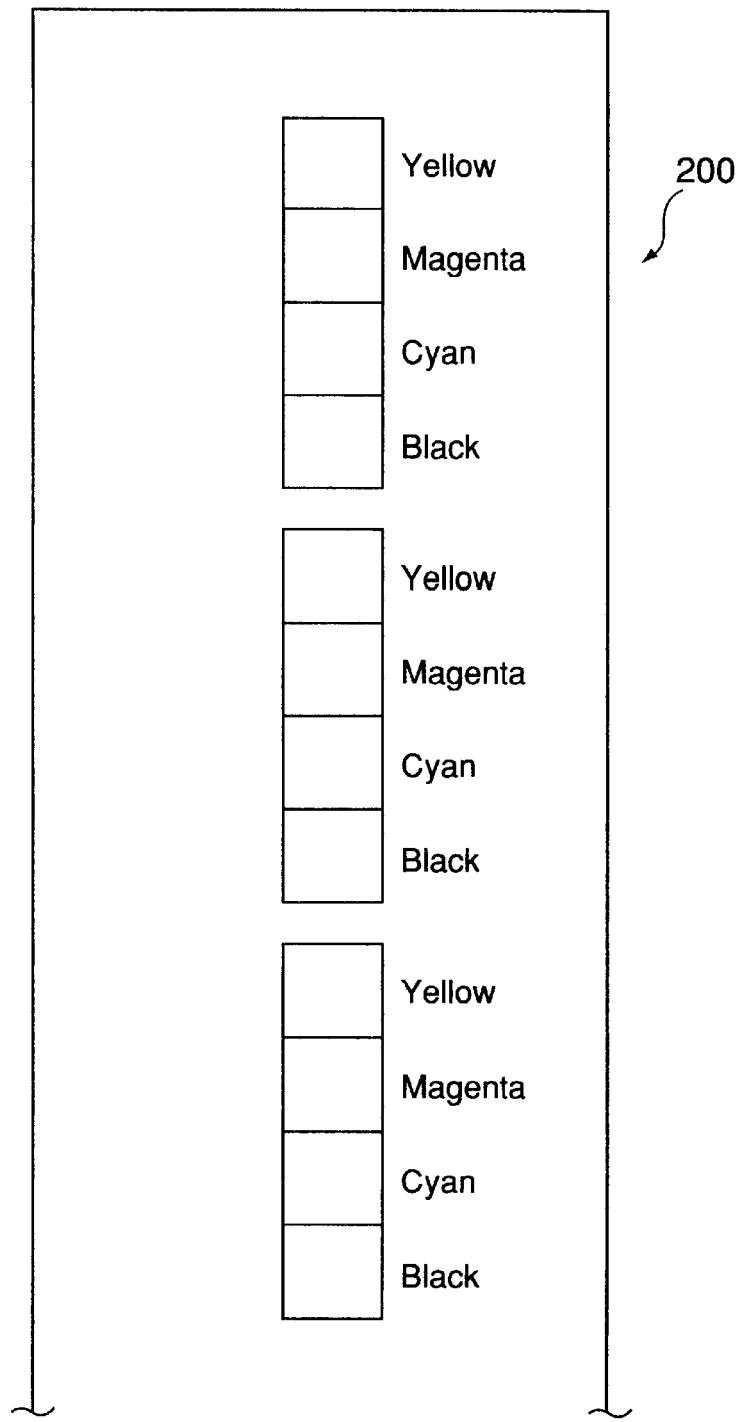
FIG. 11 shows the patch for the calibration in the second embodiment.

FIG. 10 is a flow chart for the calibration in this embodiment. An instruction for initiating the calibration is issued by an operator (S1001), a patch, that is a developer image for detecting the actual density level of each density level of the multilevel density scale, is formed on the peripheral surface of the photoconductive member, and this image is transferred onto the transfer belt 12 (S1002). The greater the number of the patches per color, in other words, the greater the number of gradation levels, the higher the calibration accuracy. In this embodiment, a patch with 17 density levels is provided for each color (17 levels in toner gradation). Referring to FIG. 11, in the patch 200, a color sequence comprising yellow, magenta, cyan, and black colors in this order is repeated.

Then, the thus created patch 200 is read by the toner density sensor 20 (S1003). The values obtained by the toner density sensor 20 are converted into density levels, and based on these density levels, the characteristics of the image forming apparatus in terms of the relationship between the input and output are calculated as they were in the first embodiment (S1004).

In this embodiment, an inputted image signal is enabled to represent 256 values, or 256 density levels, in a normal image forming operation. However, the patch created for the calibration represents only 17 toner gradation levels. Thus, the difference in the number of the density levels between an inputted image signal and the patch is dealt with by linear interpolation. However, the interpolation method does not need to be limited to the linear interpolation method. For example, such an interpolation method as a spline interpolation method or a multidimensional curve interpolation method may be employed.

Then, a lookup table (LUT) is created so that the characteristics of the image forming apparatus in terms of the relationship between the density level of an inputted image signal, which is calculated through the above described interpolation, and the density of the corresponding output, or the resultant image, becomes optimal (S1005), and this lookup table is stored (or refreshed) in the memory 40 (S1006).

The characteristics of the image forming apparatus in terms of the relationship between the input and output when the calibration is not done, and the lookup table are as shown in FIG. 5.

The above described calibration is done for each image formation speed selected by an operator.

When an image forming apparatus is calibrated as described above, even if the characteristics of the image forming apparatus in terms of the relationship between the input and output become abnormal due to the unpredicted changes in ambience, the image forming apparatus can be accurately calibrated for all image forming speeds. Therefore it is possible to always obtain images of optimal quality.

In the above described first and second embodiments, the image forming apparatus is desired to be structured so that when the image forming apparatus is automatically calibrated between the two jobs among a plurality of jobs to be carried out in a given image formation mode, the calibration is done without changing the image formation mode (image formation speed), that is, while remaining in the current image formation mode. With the provision of such a structural arrangement, it is possible to save the time necessary to change the image formation speed to carry out the calibration. Further, it is desired that the calibration for the two image formation speeds other than the current one should be carried out after the completion of the plurality of the current jobs carried out after the above described automatic calibration.

Further, when an image forming apparatus is structured so that the calibration of an image formation can be initiated, independently for each of a plurality of image formation modes, by the instruction from an operator inputted through the liquid crystal display as a displaying means, a warning "please carry out calibration for remaining two image formation modes" may be shown in the liquid crystal display after the completion of the calibration for a given image formation mode, to ensure that an operator carries out the calibration for the remaining two image formation speeds. With the provision of such a structural arrangement, it is assured that the calibration is carried out for all image formation modes, and therefore, images of optimal quality can be obtained in all image formation modes.

As is evident from the above descriptions of the first and second embodiments, according to the present invention, an image forming apparatus which has a plurality of image formation speeds is calibrated for each of the plurality of image formation speeds. Therefore, in an ordinary image forming operation, images which are optimal in gradation can be always obtained at each of the plurality of image formation speeds.

While the invention has been described with reference to the structures disclosed herein, it is not confined to the details set forth, and this application is intended to cover such modifications or changes as may come within the purposes of the improvements or the scope of the following claims.

What is claimed is:

1. An image forming apparatus comprising:
   image forming means for forming an image in accordance with an input image signal,
   wherein said image forming apparatus is operable in a first mode for forming the image by said image forming means at a first image formation speed and in a second mode for forming the image by said image forming means at a second image formation speed, which is different from the first image formation speed; and
   execution means for executing, for respective image formation speeds, calibrating operations for calibrating density of an output image formed by said image forming means in response to the input image signal.

2. An apparatus according to claim 1, wherein in each of the calibrating operations, a gradation pattern is formed on a recording material by said image forming means.

3. An image forming apparatus according to claim 2, further comprising detecting means for detecting a density of the gradation patterns.

4. An image forming apparatus according to claim 3, wherein said detecting means also functions as means for reading an original image.

5. An image forming apparatus according to claim 3, wherein said detecting means is disposed adjacent to a movement path of the recording material on which graduation patterns are formed.

6. An image forming apparatus according to claim 1, further comprising correcting means for correcting a conversion characteristic so as to provide a substantially linear relation between an image density level of the input image signal and a corresponding image density level of the output image.

7. An image forming apparatus according to claim 6, further comprising storing means for storing, for respective image formation speeds, the conversion characteristic after correction by said correcting means, wherein operations for image formation are carried out on the basis of data stored by said storing means in the respective modes.

8. An image forming apparatus according to claim 1, wherein the calibrating operations are executed independently from each other.

9. An image forming apparatus according to claim 8, further comprising display means for displaying a prompt to execute the calibrating operation for the second image formation speed, subsequent to the calibrating operation for the first image formation speed.

10. An image forming apparatus according to claim 1, wherein said executing means automatically executes calibrating operations for the first and second image formation speeds.

11. An image forming apparatus according to claim 1 further comprising selecting means for selecting one of the modes depending on a kind of recording material on which the image is to be formed.

12. An image forming apparatus according to claim 1, wherein a plurality of such image forming means are provided, by means of which a multi-color image can be formed in any of the first and second modes.

13. An image forming apparatus according to claim 12, wherein in each of the calibrating operations, a graduation pattern is formed on a recording material by said plurality of image forming means.

14. An image forming apparatus according to claim 13, further comprising detecting means for detecting a density of the graduation patterns.

15. An image forming apparatus according to claim 12, further comprising correcting means for correcting conversion characteristics so as to provide a substantially linear relation between image density levels of the input signals and corresponding image density levels of the output images.

16. An image forming apparatus according to claim 15, furhter comprising storing means for storing, for respective image formation speeds, the conversion characteristics after correction by said correction means, wherein operations for multi-color image formation are carried out on the basis of data stored by said storing means in the respective modes.

17. An image forming apparauts comprising:
image forming means for forming an image in accordance with an input image signal,
wherein said iamge forming apparatus is operable in different image forming modes; and
a processor for forming a gradation pattern by said image forming means in each of the image forming modes,
wherein said processor corrects conversion properties indicative of relations between input image signals and output image densities on the basis of image densities of the graduation patterns formed in corresponding image forming modes.

18. An apparatus according to claim 17, further comprising storing means for storing the conversion properties in the image forming modes, wherein said processor controls image formation on the basis of the conversion properties stored in said storing means corresponding to the image formation modes.

* * * * *

UNITED STATES PATENT AND TRADEMARK OFFICE
CERTIFICATE OF CORRECTION

PATENT NO. : 6,785,480 B2
DATED : August 31, 2004
INVENTOR(S) : Yuichiro Toyohara et al.

It is certified that error appears in the above-identified patent and that said Letters Patent is hereby corrected as shown below:

Column 1,
Lines 15 and 44, "above described" should read -- above-described --.

Column 2,
Line 12, "above described" should read -- above-described --.
Line 52, "graphs" should read -- graph --.

Column 3,
Line 62, "above described" should read -- above-described --.

Column 4,
Line 42, "copes" should read -- copies --, and "minutes" should read -- minute --.
Line 43, "minutes" should read -- minute --.

Column 5,
Line 9, "0.50 mg/cm 2," should read -- 0.50 mg/cm$^2$ --.

Column 6,
Lines 7 and 58, "above described" should read -- above-described --.

Column 7,
Lines 14 and 35, "above described" should read -- above-described --.

Column 8,
Line 8, "above" should read -- above- --.

Column 9,
Lines 55 and 64, "above described" should read -- above-described --.

Column 10,
Lines 6 and 18, "above described" should read -- above-described --.
Line 62, "An apparatus" should read -- An image forming apparatus --.

Column 11,
Line 5, "to" should be deleted.
Line 6, "gradu-" should read -- grad- --.
Line 31, "speeds." should read -- speeds consecutively. --.
Line 32, "claim 1" should read -- claim 1, --.

UNITED STATES PATENT AND TRADEMARK OFFICE
CERTIFICATE OF CORRECTION

PATENT NO. : 6,785,480 B2
DATED : August 31, 2004
INVENTOR(S) : Yuichiro Toyohara et al.

It is certified that error appears in the above-identified patent and that said Letters Patent is hereby corrected as shown below:

Column 12,
Lines 2, 7 and 30, "graduation" should read -- gradation --.
Line 15, "furhter" should read -- further --.
Line 17, "correction means," should read -- correcting means, --.

Signed and Sealed this

Seventh Day of December, 2004

JON W. DUDAS
*Director of the United States Patent and Trademark Office*